United States Patent
Robotham et al.

(10) Patent No.: US 6,510,158 B1
(45) Date of Patent: Jan. 21, 2003

(54) METHOD AND APPARATUS COMBINING A PLURALITY OF VIRTUAL CIRCUITS INTO A COMBINED VIRTUAL CIRCUIT

(75) Inventors: Robert E. Robotham, Ottawa (CA); Brent Gene Duckering, Vancouver (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/303,352

(22) Filed: Apr. 30, 1999

(51) Int. Cl.$^7$ ............................................. H04L 12/56
(52) U.S. Cl. ......................................... 370/399; 370/397
(58) Field of Search .................. 370/412, 428, 370/389, 395, 397, 399, 536, 395.1, 398

(56) References Cited

U.S. PATENT DOCUMENTS

| | | | | |
|---|---|---|---|---|
| 5,463,620 A | * | 10/1995 | Sriram | |
| 5,828,653 A | * | 10/1998 | Goss | 370/230 |
| 5,936,958 A | * | 8/1999 | Soumiya et al. | 370/395 |
| 5,999,534 A | * | 12/1999 | Kim | 370/395 |
| 6,104,700 A | * | 8/2000 | Haddock et al. | 370/235 |
| 6,148,001 A | * | 11/2000 | Soirinsuo et al. | 370/420 |
| 6,157,614 A | * | 12/2000 | Pasternak et al. | 370/236 |
| 6,163,542 A | * | 12/2000 | Carr et al. | 370/399 |
| 6,269,079 B1 | * | 7/2001 | Marin et al. | 370/230 |

FOREIGN PATENT DOCUMENTS

EP   1011291 A2 * 6/2000   ............ H04Q/11/04

* cited by examiner

*Primary Examiner*—Ken Vander Puye

(57) ABSTRACT

A method and apparatus includes processing for combining a plurality of virtual circuits into a combined virtual circuit, where such processing begins by buffering cells of each virtual circuit into a corresponding buffer. The processing then continues by obtaining priority information for each virtual circuit and obtaining logical buffer de-queuing information. The priority information, for example, may equate to priorities established via the varying levels of ATM services. The logical buffer de-queuing information corresponds to an access sequence for a plurality of logical ring buffers that are comprised of the buffers, or buffer identifiers. The processing then continues by generating the combined virtual circuit based on the logical buffer de-queuing information and the priority information.

19 Claims, 4 Drawing Sheets

METHOD AND APPARATUS COMBINING A PLURALITY OF VIRTUAL CIRCUITS INTO A COMBINED VIRTUAL CIRCUIT

TECHNICAL FIELD OF THE INVENTION

This invention relates generally to communications and more particularly to communication switching utilizing virtual circuits.

BACKGROUND OF THE INVENTION

Communication networks are known to include a plurality of communication switches interoperably coupled to provide communication links between end users. Such end users are coupled to the communication network via ports associated with the plurality of switches. The users may be individual users such as personal computers, telephones, videophones, facsimile machines, etc., or may be servers, routers, private branch exchange (PBX), etc. The communication network may also include a network manager that manages the establishment of communication links and overall operation of the communication system.

As is known, to establish a communication path between ports of different switches, communication links between the end point switches and intervening switches need to be established. When such links have been allocated to this particular communication, the communication may commence. As is also known, each port may support multiple communications between users that traverse the same path over a sequence of links. To reduce the amount of state information required by intervening switches, paths of the multiple communication supported by a single port may be combined into a virtual path or a virtual circuit. A virtual circuit can be comprised of a plurality of connections (i.e., communication paths between end users) that are combined to appear as a single connection. In order to distinguish the individual component connections, their payloads must carry some form of unique identifier such as the packet headers of higher level protocols such as IP or Frame Relay. Note that these unique identifiers are only required on a per packet basis rather than a per cell basis. Such combining of connections into a virtual circuit is often referred to as a virtual circuit merge.

A virtual path (VP) is a combination of a plurality of virtual circuits to produce a single virtual path. Combining virtual circuits to obtain a virtual path is often referred to as virtual path aggregation, which is specified in the ATM Standard that govern the establishment of ATM (asynchronous transfer mode) communications. Virtual path aggregation differs from virtual circuit merge in that a virtual path aggregation and segregation is done at the ATM layer level while the virtual circuit merge aggregation and segregation is done at the packet layer.

An issue arises with virtual path aggregation and virtual circuit merge in existing known implementations in that the bandwidth for each virtual circuit associated therewith is the same and each of the virtual circuits in the VP aggregation or VC merge is accessed in a round-robin manner. While this provides rather fair treatment of each virtual circuit in the VC merge or VP aggregation, it is contra to the benefits of ATM switching which allows different levels of service (e.g., different bandwidths, latencies, cost, etc.).

Therefore, a need exists for a method and apparatus that allows VP aggregation and/or VC merge of virtual circuits in a manner such that the advantages of ATM switching are realized.

DETAILED DESCRIPTION OF THE PREFERRED EMBODIMENT

Generally, the present invention provides a method and apparatus that includes processing for combining a plurality of virtual circuits into a combined virtual circuit. Such processing begins by buffering cells of each virtual circuit into a corresponding buffer. The processing then continues by obtaining priority information for each virtual circuit and obtaining logical buffer de-queuing information. The priority information, for example, may equate to priorities established via the varying levels of ATM services. The logical buffer de-queuing information corresponds to an access sequence for a plurality of logical ring buffers that are comprised of the buffers, or buffer identifiers. The processing then continues by generating the combined virtual circuit based on the logical buffer de-queuing information and the priority information. With such a method and apparatus, virtual circuits within a virtual circuit merge connection or a virtual path aggregation connection can be generated with varying degrees of priority, which may be established in accordance with the ATM services associated with the each of the virtual circuits.

Figure 1:
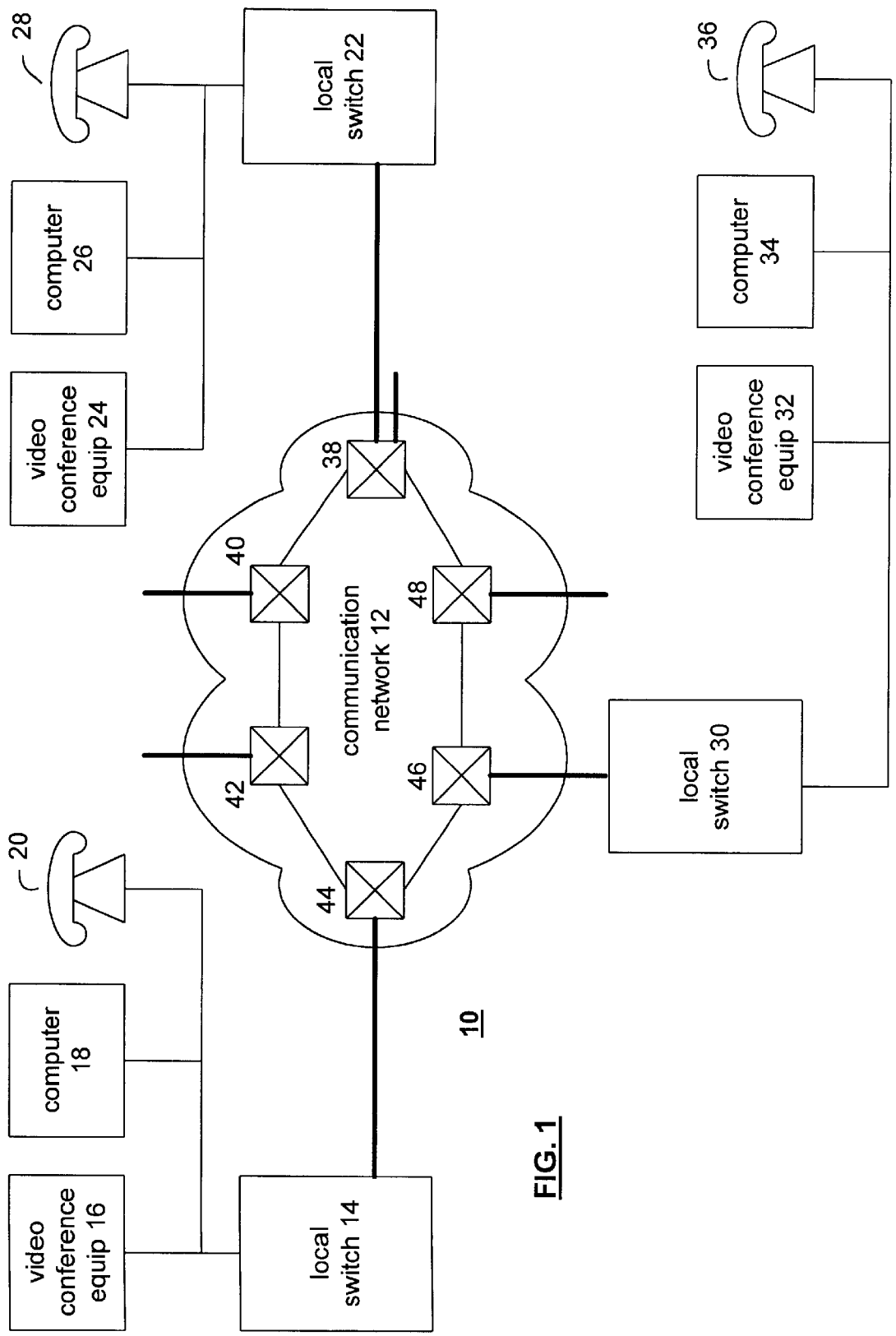
FIG. 1 illustrates a schematic block diagram of a communication network in accordance with the present invention.

The present invention can be more fully described with reference to FIGS. 1–6. FIG. 1 illustrates a schematic block diagram of a communication system 12 that includes a communication network 12 and local switches 14, 22, and 30. The communication network 12 includes a plurality of switches operably coupled to provide communication paths between nodes of the communication network, which are represented by the heavy lines. The switches of communication network 12, 38–48 may process data at the frame relay level, Internet protocol level, the ATM level, or a combination thereof. Such switches may be of the type that are manufactured and distributed by Newbridge Networks Corporation as modified in accordance with the teachings of the present invention.

The local switches 14, 22, and 30 may be similar switches to those of 38–48 but are operated by a local service provider as opposed to a long distance service provider, who operate switches 38–48. Alternatively, local switches 14, 22 and 30 may be servers, routers, private branch exchanges, etc. Each of the local switches 14, 22, and 30 are operably coupled to a plurality of end users. Such end users may be video conferencing equipment 16, 24, 32, computers 18, 26, and 34, and/or telephones 20, 28, and 36. The end user equipment may further include, but is not shown, facsimile machines, printers, web browsers, etc.

In accordance with the present invention, each of the switches, and/or only switches that provide ports to users, include either firmware or hardware that allows the switch to process virtual circuits in accordance with the present invention. Such firmware will be discussed in greater detail with reference to FIGS. 4–6.

Figure 2:
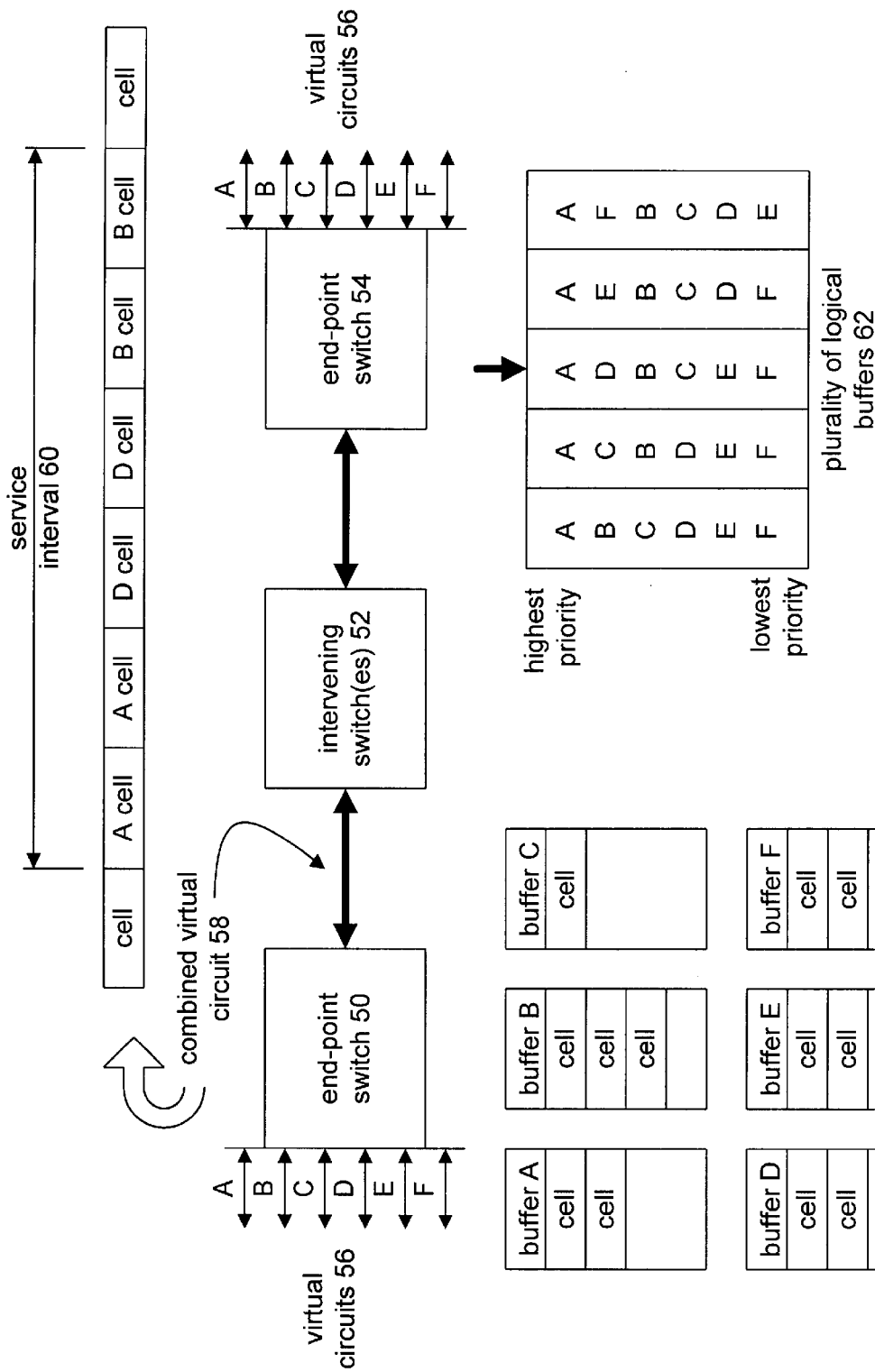
FIG. 2 illustrates a graphical representation of combining a plurality of virtual circuits in accordance with the present invention.

FIG. 2 illustrates a graphical representation of a virtual path aggregation in accordance with the present invention. As shown, endpoint switch 50 is operably coupled to a plurality of virtual circuits 56 (A–F). Endpoint switch 50 includes a plurality of buffers for storing cells of each of the virtual circuits 56. Note that the virtual circuits may be ATM packetized information of an Internet protocol packet, of a frame relay packet, or any other type of data message having a different data transport protocol. As one of average skill in the art will appreciate, the virtual circuits may be formatted in accordance with another type of data transport protocol, for example, frame relay, internet protocol, etc.

The endpoint switch 50 also includes a plurality of logical buffers 62 wherein each of the logical buffers stores an access sequence based on varying priorities of the currently received virtual circuits 56. As shown, the endpoint switch 50 currently has five logical buffers corresponding to virtual circuits 56. The access sequence is stored in each of the logical buffers 62. As such, a first access sequence is ABCDEF, a second one is ACBDEF, a third ADBCEF, a fourth AEBCDF, and a fifth AFBCDE. For this illustration, the access sequence stored in the third logical buffer of ADBCEF is utilized. Accordingly, based on the cells stored in buffers A–F and the access sequence of the third logical buffer, the endpoint switch 50 generates a combined virtual circuit 58. The number of cells accessed and placed in the combined virtual circuit is dependent on the service interval 60. In this illustration, the service interval is six cells. As one of average skill in the art will appreciate, the service interval may range from a single cell to hundreds of cells.

To produce the combined virtual circuit 58, the endpoint switch 50 accesses the third logical buffer 62 and determines that the highest priority virtual circuit is A. Based on this information, the endpoint switch 50 accesses buffer A to retrieve as many cells stored in buffer A up to the service interval length. In this illustration, buffer A is storing two cells. As such, the first two cells of the combined virtual circuit for the current service interval are filled with cells of virtual circuit A. The endpoint switch then accesses the logical buffer to determine that the next highest priority virtual circuit is D. The endpoint switch 50 access buffer D to retrieve the two cells for virtual circuit D and places those in the next two cells of the service interval. Having done this, the endpoint switch 50 then accesses the logical buffer 62 to determine that the next highest priority virtual circuit is B. The endpoint switch 50 accesses buffer B to retrieve cells stored in buffer B. Endpoint switch 50 determines that only two cells can be retrieved to complete the service interval 60. As such, endpoint switch only retrieves two cells from buffer B. On the next service interval, endpoint switch 50 again accesses the logical buffer 62 and determines that the highest priority virtual circuit is A. If no new cells for virtual circuit A have been received during the previous service interval, the endpoint switch traverses the logical buffer 62 until it finds a buffer A–F that contains the next highest priority level virtual circuit and has cells to be transported.

The combined virtual circuit 58 is transported to an intervening switch or intervening switches 52. The intervening switches treat the combined virtual circuit 58 as a single connection and transports it to endpoint switch 54. Endpoint switch 54 decouples the combined virtual circuit to recapture the virtual circuits 56.

As one of average skill will appreciate from FIG. 2, the number of virtual connections may be placed on the same ring buffer and the servicing between virtual connections on the same ring buffer is affected by weighting factors. As such, while the ring buffers may be labeled as A, B, C, etc., the buffers that store cells for each virtual circuit may include different labels, such as A1, A2, B1, C1, etc. In addition, when a number of virtual circuits are on a single ring buffer, weighting factors may be associated with the connections (e.g., A1 may have n cells serviced for every m cells serviced for A2). As indicated, each buffer is associated with a single ring buffer, however, more than one buffer can be associated with a single ring buffer.

Figure 3:
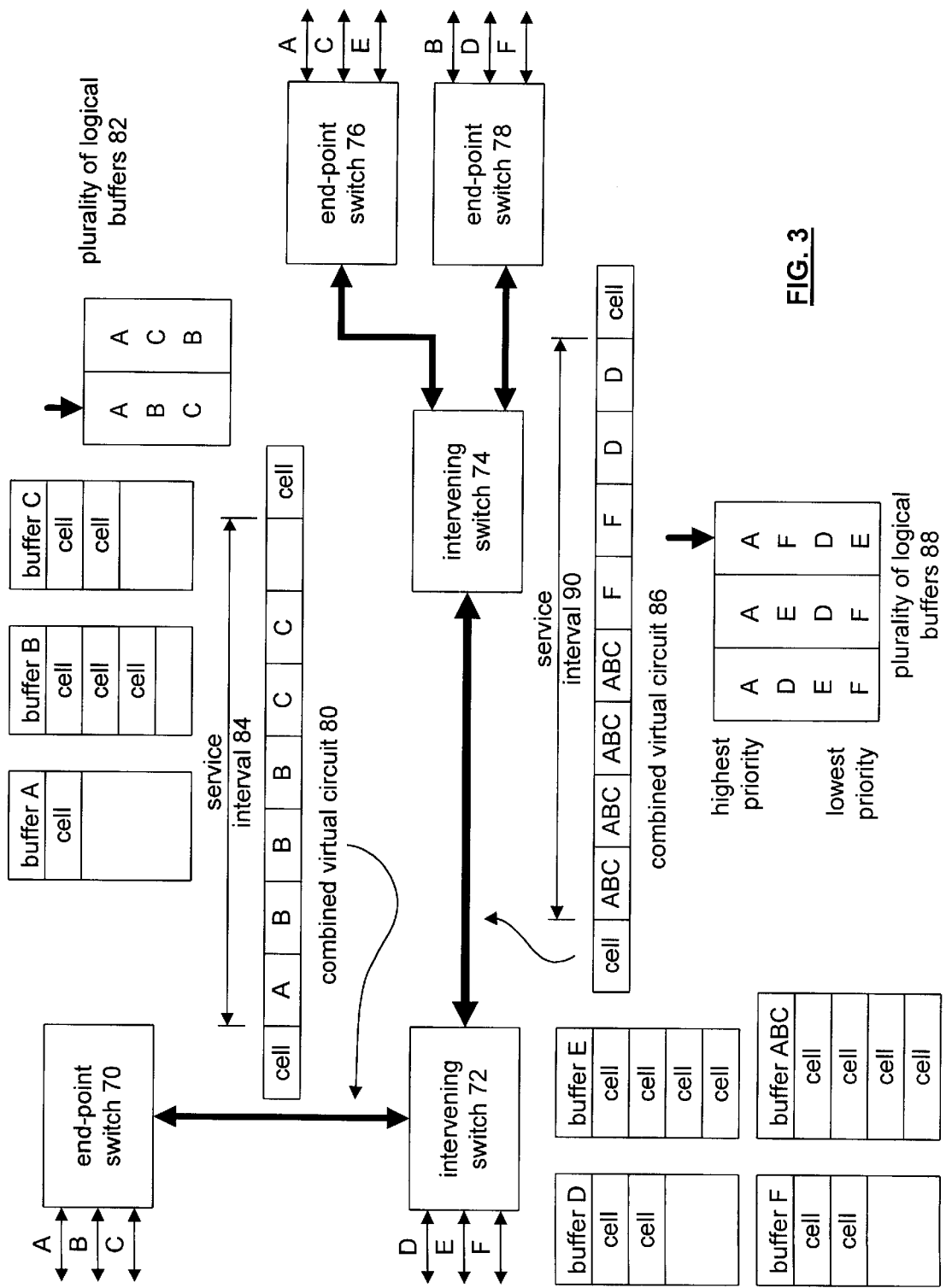
FIG. 3 illustrates a graphical representation of combining virtual circuits in accordance with the present invention.

FIG. 3 illustrates another graphical representation of producing a combined virtual circuit in accordance with the present invention. As shown, endpoint switch 70 is operably coupled to receive three virtual circuits A, B and C. Endpoint switch 70 correspondingly has three buffers A, B, and C to store cells of the virtual circuit. In addition, endpoint switch 70 has a plurality of logical buffers 82 to store the access sequence for producing the combined virtual circuit 80. In this illustration, the service interval 84 is seven cells in length. Based on the cells stored in buffers A, B, and C and the first logical buffer having an access sequence of A, B, and C, endpoint switch 70 generates the combined virtual circuit 80. As shown, the combined virtual circuit for the current service interval 84 has the first cell from virtual circuit A, the next three cells from virtual circuit B and two cells from virtual circuit C. Since the virtual circuits only have six cells to transport at this time, the seventh cell remains empty. Alternatively, the endpoint switch 70 may adjust the service interval such that no cells are unused.

Intervening switch 72 receives the combined virtual circuit 80 and further receives virtual circuits D, E, and F. To produce combined virtual circuit 86, the intervening switch 72 contains buffers for virtual circuits D, E, and F and a buffer for combined circuit 80. In addition, intervening switch 72 includes a plurality of logical buffers 88 that contain varying access sequences. Based on this information, the intervening switch 72 produces the combined virtual circuit 86 for the current service interval 90. Note that within the plurality of logical buffers 88, the A represents cells from buffer ABC.

The combined virtual circuit 86 is provided to intervening switch 74. The intervening switch 74 separates each of the virtual circuits from the combined virtual circuit 86 and reconstructs two combined virtual circuits, one containing cells from virtual circuit A, C, and E, and another containing cells from virtual circuit B, D, and F. The combined virtual circuit containing virtual circuits A, C, and E are provided to endpoint switch 76. The combined virtual circuit containing cells B, D, and F are provided to endpoint switch 78. To perform this separation and reassembly of the combined virtual circuits, intervening switch 74 includes a plurality of buffers and associated logical buffers.

As one of average skill in the art will appreciate, the number of buffers used by a switch to produce a combined virtual circuit is dependent on the number of virtual circuits to be combined. Further, the plurality of logical buffers is also dependent upon the number of virtual circuits to be combined and can be derived by the intervening switch based on priorities prescribed to each virtual circuit, which may be in accordance with ATM priorities such as cost, bandwidth, latency, etc. As one of average skill in the art will further appreciate, each of the buffers and logical buffers may be established as ring buffers that contain a head pointer and tail pointer such that from service interval to service interval, the intervening switch can readily determine which cells are to be provided in the current combined virtual circuit. In addition, the access sequence contained in the logical buffers may be changed from service interval to service interval, may remain fixed for a certain number of service intervals, or may remain fixed until changed by a network administrator.

Figure 4:
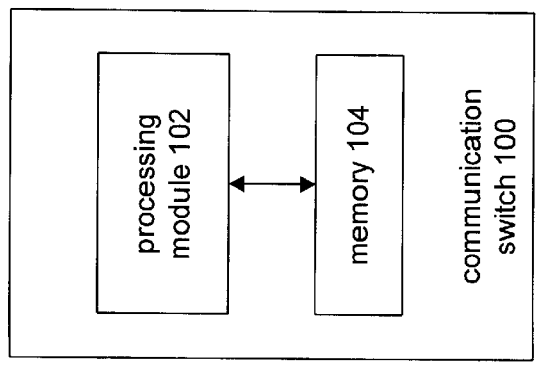
FIG. 4 illustrates a schematic block diagram of a communication switch in accordance with the present invention.

FIG. 4 illustrates a simplified schematic block diagram of a communication switch 100. The communication switch 100 includes a processing module 102 and memory 104. As one of average skill in the art will appreciate, the communication switch 100 further includes communication ports, data transport protocol processing circuitry, memory, etc., which is not shown for clarity. The processing module 102 may be a single processing device or a plurality of processing devices. Such processing device may be a microprocessor, microcomputer, digital signal processor, state machine, logic circuitry and/or any device that manipulates data based on operational instructions. The memory 104 may be a single memory device or a plurality of memory devices. Such a memory device may be a random access memory, read-only memory, floppy disk memory, system memory, and/or any device that stores digital information. If the processing module implements one or more of its functions via a state machine or logic circuitry, the memory storing the corresponding operational instructions will be imbedded within the circuitry comprising the state machine and/or circuit. Further note that the processing module 102 and memory 104 may be comprised of existing circuitry within a communication switch 100. The operational instructions stored in memory 104 and executed by processing module 102 are further illustrated in FIGS. 5 and 6.

Figure 5:
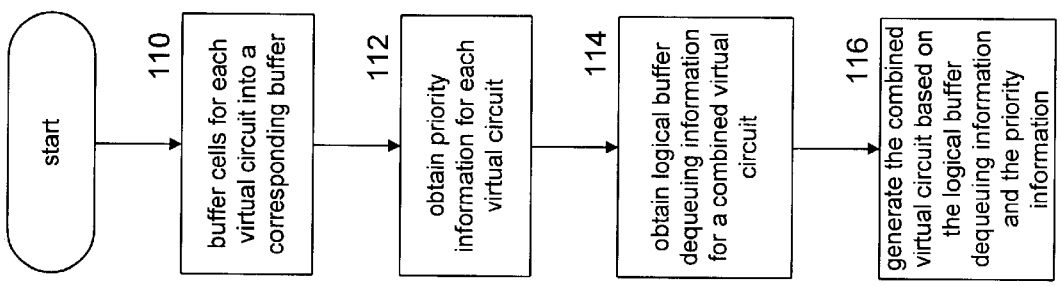
FIG. 5 illustrates a logic diagram of combining virtual circuits in accordance with the present invention.

FIG. 5 illustrates a logic diagram of a method for combining a plurality of virtual circuits into a combined virtual circuit. The process begins at step 110 where cells for each virtual circuit are buffered in a corresponding buffer. The process then proceeds to step 112 where priority information is obtained for each virtual circuit. The priority information for each virtual circuit includes a logical ring buffer identifier and a weighting factor relative to a logical ring buffer of a plurality of logical ring buffers. This was illustrated with reference to FIGS. 2 and 3 where the plurality of logical buffers included an access sequence wherein the buffer was identified by the logical ring buffer identifier (e.g., A, B, C, etc.).

The process then proceeds to step 114 where logical buffer de-queuing information is obtained for generating a combined virtual circuit. The logic buffer de-queuing information includes an access sequence for each of the plurality of ring buffers. Again, this was illustrated with reference to FIGS. 2 and 3. The process then continues to step 116 where the combined virtual circuit is generated based on the logical buffer de-queuing information and the priority information. Note that the combined virtual circuit may be a virtual path aggregation or a virtual circuit merge. When the combined virtual circuit is based on a virtual circuit merge, the combined virtual circuit is generated based on an end-of-message detection for each virtual circuit and the cells for each virtual circuit are transported per service interval. As one of average skill in the art will appreciate, an end-of-message, which may be indicating the end of a higher level protocol packet, is contained in the last cell sent before starting service of another virtual circuit. In addition, if a virtual circuit merge is being performed, then cells of a component virtual circuit are only considered for transmission after a cell containing the end-of-message indication has been queued. One of average skill in the art will further appreciate that the use of weighting factors between virtual circuits may be used on the same circular buffer.

The logical buffer de-queuing information used to produce the combined virtual circuit may be established in a round-robin manner based on weighting factors for each of the plurality of virtual circuits. The round robin ordering constitutes the plurality of logical ring buffers. To facilitate the accessing of ring buffers, each ring buffer includes a head and/or tail pointer. The de-queuing information further indicates that a cell from a next priority level logic ring buffer will be accessed when the current priority logical ring buffer is empty. This was illustrated with reference to FIGS. 2 and 3.

Figure 6:
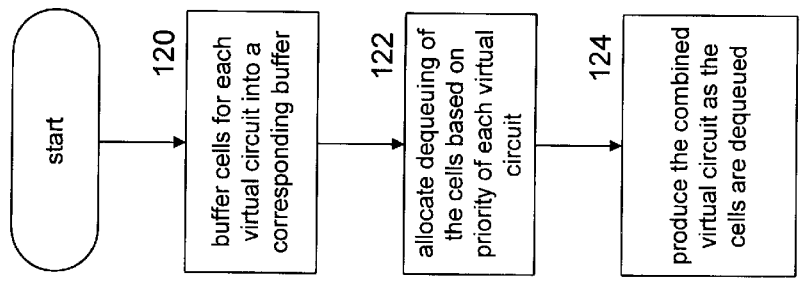
FIG. 6 illustrates a logic diagram of an alternate method for combining virtual circuits in accordance with the present invention.

FIG. 6 illustrates a logic diagram of an alternate method for combining a plurality of virtual circuits into a combined virtual circuit. The process begins at step 120 where cells from each virtual circuit are buffered in a corresponding buffer. The process then proceeds to step 122 where de-queuing of the cells is based on priority of each virtual circuit. Such de-queuing may be done in an allocated manner such that the de-queuing sequence varies to provide adequate priority accessing. The process then proceeds to step 124 where the combined virtual circuit is produced as the cells are de-queued. Note that the combine virtual circuit may be produced based on an end-of-message detection for a virtual circuit and such cells for the virtual circuit are transported per service interval. Alternatively, the de-queuing of the cells from the plurality of buffers may be done in a round-robin manner based on a weighting factor for each virtual circuit where the de-queuing order constitutes a plurality of logical ring buffers. When de-queued in this manner, a cell from a next prior level logical ring buffer is de-queued when the current priority logical ring buffer is empty. With respect to a virtual circuit merge, the de-queuing may be based on a combination of EOM messages and weighted round-robin, where the weights might correspond to the number of fall packets a connection gets to send (assuming it has at least this many packets buffered) before going to the next connection in the ring buffer, or the weight may be a minimum number of cells guarantee whereby the connection will send at least this many cells up to the next EOM (or all of the full packets that are currently buffered for this connection, whichever is fewer cells) before the ring buffer switches to the next connection. These are just two of the many possibilities.

The preceding discussion has presented a method and apparatus for combining a plurality of virtual circuits into a combined virtual circuit. With such a method and apparatus, virtual path aggregation connections and virtual circuit merge connections maintain ATM varying levels of service which was not achieved in previous embodiments. As one of average skill in the art will appreciate, other embodiments may be derived from the teachings of the present invention without deviating from the scope of the claims.

What is claimed is:

1. A method for combining a plurality of virtual circuits into a combined virtual circuit, the method comprises the steps of:

a) buffering cells of each of the plurality of virtual circuits into a corresponding one of a plurality of buffers;

b) obtaining priority information for each of the plurality of virtual circuits;

c) obtaining logical buffer dequeuing information for the combined virtual circuit; and d) generating the combined virtual circuit based on the logical buffer dequeuing information and the priority information of each of the plurality of virtual circuits, wherein the combined virtual circuit is at least one of a virtual path aggregation and a virtual circuit merge wherein step (d) further comprises generating the virtual circuit merge based on an end of message detection for a virtual circuit of the plurality of virtual circuits and cells transported per service interval for the virtual circuit.

2. A method for combining a plurality of virtual circuits into a combined virtual circuit, the method comprises the steps of:
   a) buffering cells of each of the plurality of virtual circuits into a corresponding one of a plurality of buffers;
   b) obtaining priority information for each of the plurality of virtual circuits;
   c) obtaining logical buffer dequeuing information for the combined virtual circuit; and
   d) generating the combined virtual circuit based on the logical buffer dequeuing information and the priority information of each of the plurality of virtual circuits, wherein the priority information for each of the plurality of virtual circuits comprises a logical ring buffer identifier and a weighting factor relative to a logical ring buffer of a plurality of logical ring buffers identified by the logical ring buffer identifier.

3. The method of claim 2, wherein the logical buffer dequeuing information comprises an accessing sequence for the plurality of logical ring buffers.

4. The method of claim 3, wherein step (c) further comprises dequeuing cells from the plurality of buffers in a round robin manner based on the weighting factors of the plurality of virtual circuits, wherein ordering of the plurality of buffers constitutes the plurality of logical ring buffers.

5. The method of claim 4, further comprises maintaining head and/or tail pointers of each of the plurality of logical ring buffers.

6. The method of claim 4, further comprises dequeuing a cell from a next priority level logical ring buffer of the plurality of logical ring buffers when the current priority logical ring buffer of the plurality of logical ring buffers is empty.

7. A method for combining a plurality of virtual circuits into a combined virtual circuit, the method comprises the steps of:
   a) buffering cells of each of the plurality of virtual circuits into a corresponding one of a plurality of buffers;
   b) dequeuing of the cells based on priority of each of the plurality of virtual circuits and a virtual circuit accessing sequence; and
   c) producing the combined virtual circuit as the cells are dequeued, wherein the combined virtual circuit is at least one of a virtual path aggregation and a virtual circuit merge, wherein step (c) further comprises, producing the virtual circuit merge based on an end of message detection for a virtual circuit of the plurality of virtual circuits and cells transported per service interval for the virtual circuit.

8. A method for combining a plurality of virtual circuits into a combined virtual circuit, the method comprises the steps of:
   a) buffering cells of each of the plurality of virtual circuits into a corresponding one of a plurality of buffers;
   b) dequeuing of the cells based on priority of each of the plurality of virtual circuits and a virtual circuit accessing sequence; and
   c) producing the combined virtual circuit as the cells are dequeued, wherein the priority for each of the plurality of virtual circuits comprises a logical ring buffer identifier and a weighting factor relative to a logical ring buffer of a plurality of logical ring buffers identified by the logical ring buffer identifier.

9. The method of claim 8, wherein step (c) further comprises dequeuing the cells from the plurality of buffers in a round robin manner based on the weighting factors of the plurality of virtual circuits, wherein ordering of the plurality of buffers constitutes the plurality of logical ring buffers.

10. The method of claim 9, further comprises dequeuing a cell from a next priority level logical ring buffer of the plurality of logical ring buffers when the current priority logical ring buffer of the plurality of logical ring buffers is empty.

11. A communication switch comprises:
   processing module; and
   memory operably coupled to the processing module, wherein the memory-includes operational instructions that cause the processing module to (a) buffer cells of each of the plurality of virtual circuits into a corresponding one of a plurality of buffers; (b) obtain priority information for each of the plurality of virtual circuits; (c) obtain logical buffer dequeuing information for the combined virtual circuit; and (d) generate the combined virtual circuit based on the logical buffer dequeuing information and the priority information of each of the plurality of virtual circuits, wherein the combined virtual circuit is at least one of a virtual path aggregation and a virtual circuit merge, wherein the memory further comprises operational instructions that cause the processing module to generate the virtual circuit merge based on an end of message detection for a virtual circuit of the plurality of virtual circuits and cells transported per service interval for the virtual circuit.

12. The communication switch of claim 11, wherein the priority information for each of the plurality of virtual circuits comprises a logical ring buffer identifier and a weighting factor relative to a logical ring buffer of a plurality of logical ring buffers identified by the logical ring buffer identifier.

13. The communication switch of claim 12, wherein the logical buffer dequeuing information comprises an accessing sequence for the plurality of logical ring buffers.

14. The communication switch of claim 13, wherein the memory further comprises operational instructions that cause the processing module to dequeue cells from the plurality of buffers in a round robin manner based on the weighting factors of the plurality of virtual circuits, wherein ordering of the plurality of buffers constitutes the plurality of logical ring buffers.

15. The communication switch of claim 14, wherein the memory further comprises operational instructions that cause the processing module to dequeue a cell from a next priority level logical ring buffer of the plurality of logical ring buffers when the current priority logical ring buffer of the plurality of logical ring buffers is empty.

16. A communication switch comprises:
   processing module; and
   memory operably coupled to the processing module, wherein the memory includes operational instructions that cause the processing module to (a) buffer cells of each of the plurality of virtual circuits into a corresponding one of a plurality of buffers; (b) dequeue the cells based on priority of each of the plurality of virtual circuits and a virtual circuit accessing sequence; and (c)

produce the combined virtual circuit as the cells are dequeued, wherein the combined virtual circuit is at least one of a virtual path aggregation and a virtual circuit merge, wherein the memory further comprises operational instructions that cause the processing module to produce the virtual circuit merge based on an end of message detection for a virtual circuit of the plurality of virtual circuits and cells transported per service interval for the virtual circuit.

17. A communication switch comprises:

processing module; and memory operably coupled to the processing module, wherein the memory includes operational instructions that cause the processing module to (a) buffer cells of each of the plurality of virtual circuits into a corresponding one of a plurality of buffers; (b) dequeue the cells based on priority of each of the plurality of virtual circuits and a virtual circuit accessing sequence; and (c) produce the combined virtual circuit as the cells are dequeued, wherein the priority for each of the plurality of virtual circuits comprises a logical ring buffer identifier and a weighting factor relative to a logical ring buffer of a plurality of logical ring buffers identified by the logical ring buffer identifier.

18. The communication switch of claim 17, wherein the memory further comprises operational instructions that cause the processing module to dequeue the cells from the plurality of buffers in a round robin manner based on the weighting factors of the plurality of virtual circuits, wherein ordering of the plurality of buffers constitutes the plurality of logical ring buffers.

19. The communication switch of claim 18, wherein the memory further comprises operational instructions that cause the processing module to dequeue a cell from a next priority level logical ring buffer of the plurality of logical ring buffers when the current priority logical ring buffer of the plurality of logical ring buffers is empty.

* * * * *